US008081619B2

(12) United States Patent
Jiang

(10) Patent No.: US 8,081,619 B2
(45) Date of Patent: Dec. 20, 2011

(54) METHOD AND APPARATUS OF DECIPHERING PARAMETER SYNCHRONIZATION IN A WIRELESS COMMUNICATIONS DEVICE

(75) Inventor: Sam Shiaw-Shiang Jiang, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 950 days.

(21) Appl. No.: 11/790,650

(22) Filed: Apr. 26, 2007

(65) Prior Publication Data

US 2007/0253401 A1 Nov. 1, 2007

Related U.S. Application Data

(60) Provisional application No. 60/745,750, filed on Apr. 27, 2006.

(51) Int. Cl.
*H04J 3/06* (2006.01)

(52) U.S. Cl. ........ 370/350; 370/338; 370/331; 370/328; 370/400; 370/401; 370/351; 370/356; 370/352; 455/445; 455/417; 455/432.1; 455/436; 455/432.2; 455/439; 455/435.2

(58) Field of Classification Search .................. 370/338, 370/331, 328, 400, 401, 351, 356, 352; 455/445, 455/417, 432.1, 436, 432.2, 439, 435.2
See application file for complete search history.

(56) References Cited

U.S. PATENT DOCUMENTS

| | | | |
|---|---|---|---|
| 6,415,410 B1* | 7/2002 | Kanerva et al. ............... 714/749 |
| 6,891,818 B1* | 5/2005 | Jarvisalo et al. ............. 370/337 |
| 7,525,908 B2* | 4/2009 | Olsson et al. ................ 370/229 |
| 7,623,478 B2* | 11/2009 | Froc et al. .................... 370/278 |
| 2002/0097809 A1 | 7/2002 | Jiang |
| 2003/0157927 A1* | 8/2003 | Yi et al. ........................ 455/411 |
| 2004/0235447 A1* | 11/2004 | Gronberg et al. ............ 455/403 |
| 2005/0245276 A1 | 11/2005 | Torsner |
| 2005/0270996 A1* | 12/2005 | Yi et al. ........................ 370/312 |
| 2007/0041382 A1* | 2/2007 | Vayanos et al. .............. 370/394 |

FOREIGN PATENT DOCUMENTS

| | | |
|---|---|---|
| EP | 1 710 945 A2 | 10/2006 |
| JP | 2003224618 A | 8/2003 |
| JP | 2003339075 A | 11/2003 |
| JP | 2006-013610 | 1/2006 |
| WO | WO-01/22646 A1 | 3/2001 |
| WO | 2006/002677 A1 | 1/2006 |

OTHER PUBLICATIONS

3GPP TS 25.321 V6.7.0(Dec. 2005), Medium Access Control (MAC) protocol specification (Release 6).
3GPP TS 25.322 V6.6.0 (Dec. 2005), "Radio Link Control (RLC) protocol specification".
3 GPP TS 25.322 version 6.5.0 Release 6,(Sep. 2005),"Universal Mobile Telecommunications Systems (UMTS)".
Siemens AG, Title: Discard upon out-of-sequence reception in UM RLC, 3GPP TSG-RAN WG2 Meeting #19, R2-010614, Sophia Antipolis, France, 19th-23th Feb. 2000, P1-P2.

* cited by examiner

*Primary Examiner* — Kwasi Karikari

(74) *Attorney, Agent, or Firm* — Klein, O'Neill & Singh, LLP

(57) ABSTRACT

A method of deciphering parameter synchronization in a reception end of a wireless communications system includes setting a receiving window of a first entity as a Push Type window with a window size greater than or equal to a window size of a receiving window of a second entity when the second entity operates in an acknowledged mode.

12 Claims, 5 Drawing Sheets

METHOD AND APPARATUS OF DECIPHERING PARAMETER SYNCHRONIZATION IN A WIRELESS COMMUNICATIONS DEVICE

CROSS REFERENCE TO RELATED APPLICATIONS

This application claims the benefit of U.S. Provisional Application No. 60/745,750, filed on Apr. 27, 2006 and entitled "Method and Apparatus for Deciphering Parameter Synchronization," the contents of which are incorporated herein by reference.

BACKGROUND OF THE INVENTION

1. Field of the Invention

The present invention relates to a method and apparatus of deciphering parameter synchronization in a wireless communications device, and more particularly to a method and related apparatus capable of reducing signaling overhead and avoiding radio resource waste.

2. Description of the Prior Art

In a wireless communications system, in order to protect user data and signaling information from being intercepted by unauthorized devices, the prior art can perform encryption on packets transmitted between a sender and a receiver via a ciphering/deciphering method. Firstly, the sender generates keystream data via a specified algorithm based on ciphering key (CK), ciphering sequence number (SN), and other parameters or variables, and encrypts plain-text data with the keystream data to generate cipher-text data. The receiver can decipher the cipher-text data by inverse operations, so that the CK is important. Besides the CK, the ciphering SN is another important parameter used for data ciphering in the wireless communications system. The ciphering SN is formed by sequence numbers. For example, in a third generation (3G) mobile telecommunications system, the ciphering SN, called the whole SN, is composed of a 20-bit Radio Link Control Hyper Frame Number (RLC HFN) and a 12-bit Radio Link Control Sequence Number (RLC SN).

The whole SN is supposed to be carried along with the packet over the air without being ciphered, so as to maintain synchronization and accuracy of signal transmission between the sender and receiver. The whole SN is an overhead for the ciphering. To reduce the overhead, the prior art divides the whole SN into two parts, one is so-called SN embedded in a header of a packet, and the other is HFN stored in both the sender and the receiver. HFN is similar to a carrying number of SN. Each time SN wraps around its maximum representing value back to 0, HFN is incremented by one in the sender and in the receiver. For example, if SN is represented by 7 bits, which counts from 0 to 127, once SN is beyond 127, HFN is incremented by 1, and SN restarts from 0. As a result, according to SN, the sender and the receiver can timely increment HFN, so as to keep synchronization of HFN and maintain ciphering and deciphering processes.

To ensure the correct maintenance of HFN's, a sliding window can be used if the lower layer supports out of sequence delivery. There are two types of the sliding window, Push Type and Pull Type. The Push Type window is as the receiving window used in the RLC AM entity in UMTS (Universal Mobile Telecommunications System) as specified in 3GPP TS 25.322 "Radio Link Control protocol specification". The Push Type window is advanced only when a packet corresponding to the lower edge of the window is received successfully or is informed to be discarded. When a packet with SN outside the Push Type window, the packet is discarded. The Pull Type window is as the receiving window used in the Reordering entity of HSDPA (High Speed Downlink Packet Access) in UMTS as specified in 3GPP TS 25.321 "Medium Access Control protocol specification". The Pull Type window is advanced when a packet with SN outside the window is received and the SN is set to be the updated upper edge of the Pull Type window.

In the prior art, the window type and window size of the sliding window for the purpose of identifying HFN value for deciphering is not carefully specified. If they are not correctly used, HFN may become out of synchronization between the sender and the receiver.

For example, suppose window sizes of the receiving windows used for the HARQ (Hybrid Automatic Repeat Request) entity and the RLC entity are 10 and 16 in a receiver in UMTS, and the Pull Type window is used for a deciphering entity of the PDCP entity (Packet Data Convergence Protocol) with window size=10. If packets with SN=0~9 are successfully received except the packet with SN=0, then the receiving window of the deciphering entity spans from 0 to 9. Now, if a packet with SN=10 is received, the receiving window of the deciphering entity is advanced to span from 1 to 10. Suppose that the missing SN=0 is due to HARQ residue error, such as NACK_to_ACK (non-acknowledgement to acknowledgement) error or DTX_to_ACK (discontinue transmission to acknowledgement) error, so that retransmission of the packet with SN=0 will be triggered by the RLC entity. Suppose that the packet with SN=0 is retransmitted after a NACK status reported by the RLC entity and is received successfully. Packet with SN=0 is then delivered to the deciphering entity. Since SN=0 is now outside the receiving window of the deciphering entity, the deciphering entity takes SN=0 to be belong to the next SN cycle, and the Pull Type window will advance the window with HFN incremented. The HFN will become out of synchronization between the Receiver and the Sender thereafter.

On the other hand, suppose that the Push Type window is used for the receiving window of the deciphering entity with window size=10 in the above example. If packets with SN=0~9 are successfully received except the packet with SN=0, then the receiving window of the deciphering entity spans from 0 to 9. Now, if a packet with SN=10 is received, the Push Type window will neglect and discard this packet since it is outside the window. Since the RLC entity will not request for retransmission of SN=10, the window in the deciphering entity will be stalled thereafter.

SUMMARY OF THE INVENTION

According to the present invention, a method of deciphering parameter synchronization in a reception end of a wireless communications system comprises setting a receiving window of a first entity as a Push Type window with a window size greater than or equal to a window size of a receiving window of a second entity when the second entity operates in an acknowledged mode.

According to the present invention, a communications device of a wireless communications system utilized for keep deciphering parameter synchronization comprises a control circuit for realizing functions of the communications device, a processor installed in the control circuit for executing a program code to operate the control circuit, and a memory coupled to the processor for storing the program code. The program code comprises setting a receiving window of a first entity as a Push Type window with a window size greater than or equal to a window size of a receiving window of a second entity when the second entity operates in an acknowledged mode.

According to the present invention, a method of deciphering parameter synchronization in a reception end of a wireless communications system comprises setting a receiving window of a first entity as a Pull Type window when a second entity operates in an unacknowledged mode or transparent mode.

According to the present invention, a communications device of a wireless communications system utilized for keep deciphering parameter synchronization comprises a control circuit for realizing functions of the communications device, a processor installed in the control circuit for executing a program code to operate the control circuit, and a memory coupled to the processor for storing the program code. The program code comprises setting a receiving window of a first entity as a Pull Type window when a second entity operates in an unacknowledged mode or transparent mode.

According to the present invention, a method of deciphering parameter synchronization in a reception end of a wireless communications system comprises setting a receiving window of a first entity as a Pull Type window with a window size greater than or equal to a window size of a receiving window of a second entity.

According to the present invention, a communications device of a wireless communications system utilized for keep deciphering parameter synchronization comprises a control circuit for realizing functions of the communications device, a processor installed in the control circuit for executing a program code to operate the control circuit, and a memory coupled to the processor for storing the program code. The program code comprises setting a receiving window of a first entity as a Pull Type window with a window size greater than or equal to a window size of a receiving window of a second entity. These and other objectives of the present invention will no doubt become obvious to those of ordinary skill in the art after reading the following detailed description of the preferred embodiment that is illustrated in the various figures and drawings.

DETAILED DESCRIPTION

Figure 1:
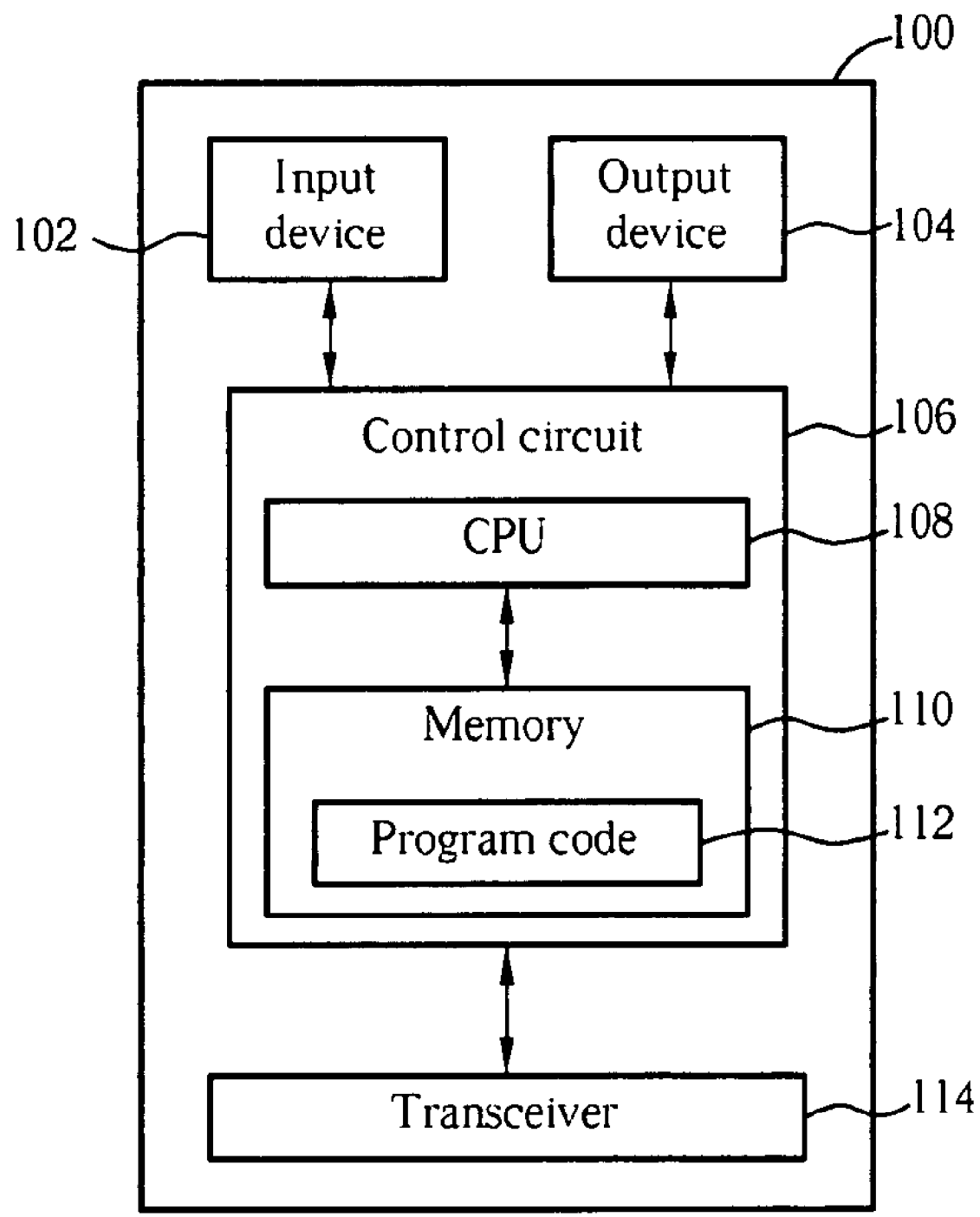
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system.

Figure 2:
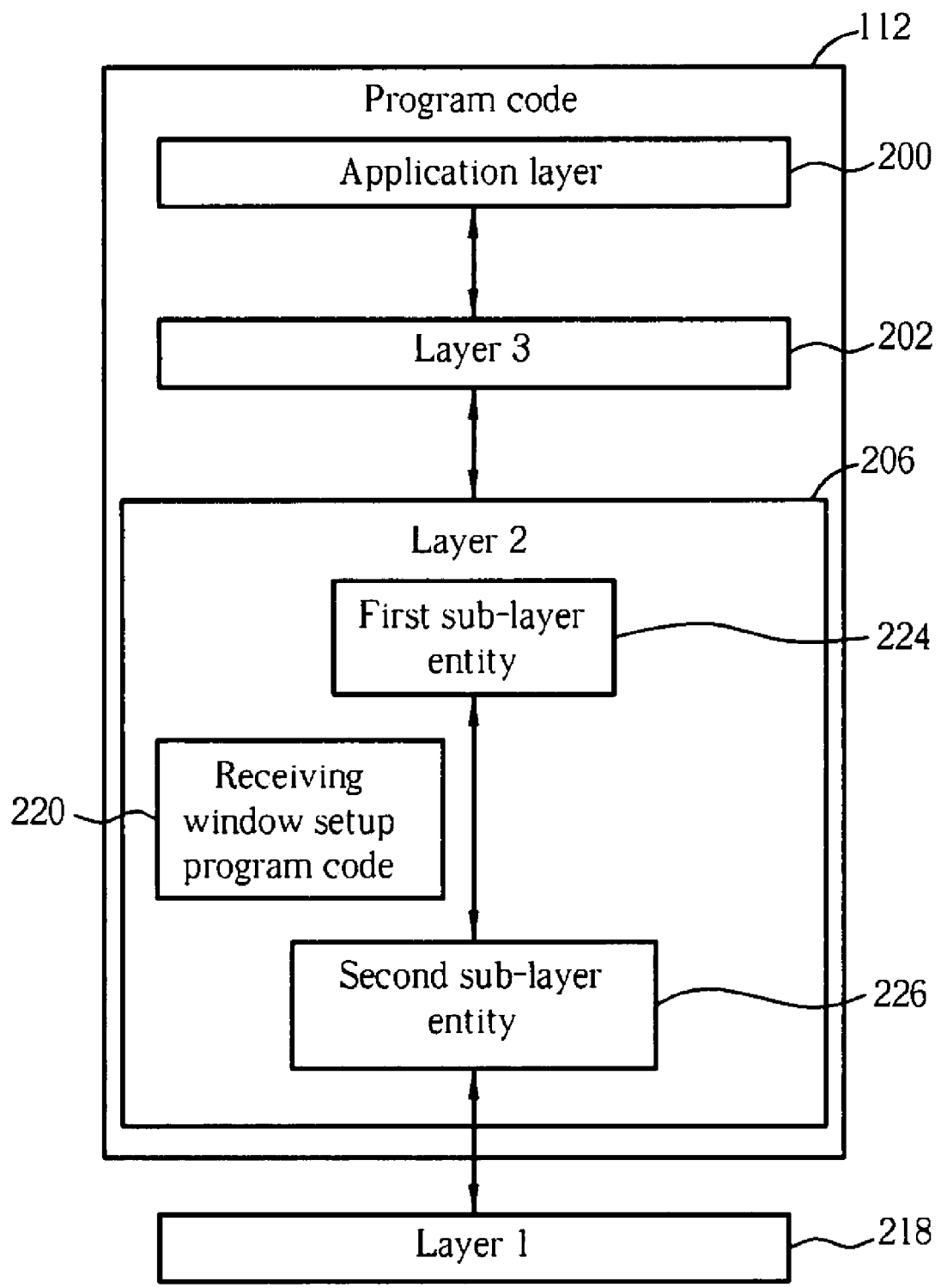
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 2 206 comprises two sub-layers: a first sub-layer entity 224 and a second sub-layer entity 226. The first sub-layer entity 224 performs ciphering and deciphering operations according to parameters or variables of ciphering key, ciphering SN, etc. The second sub-layer entity 226 can be a combination of an RLC entity and a MAC (Media Access Control) entity.

Figure 3:
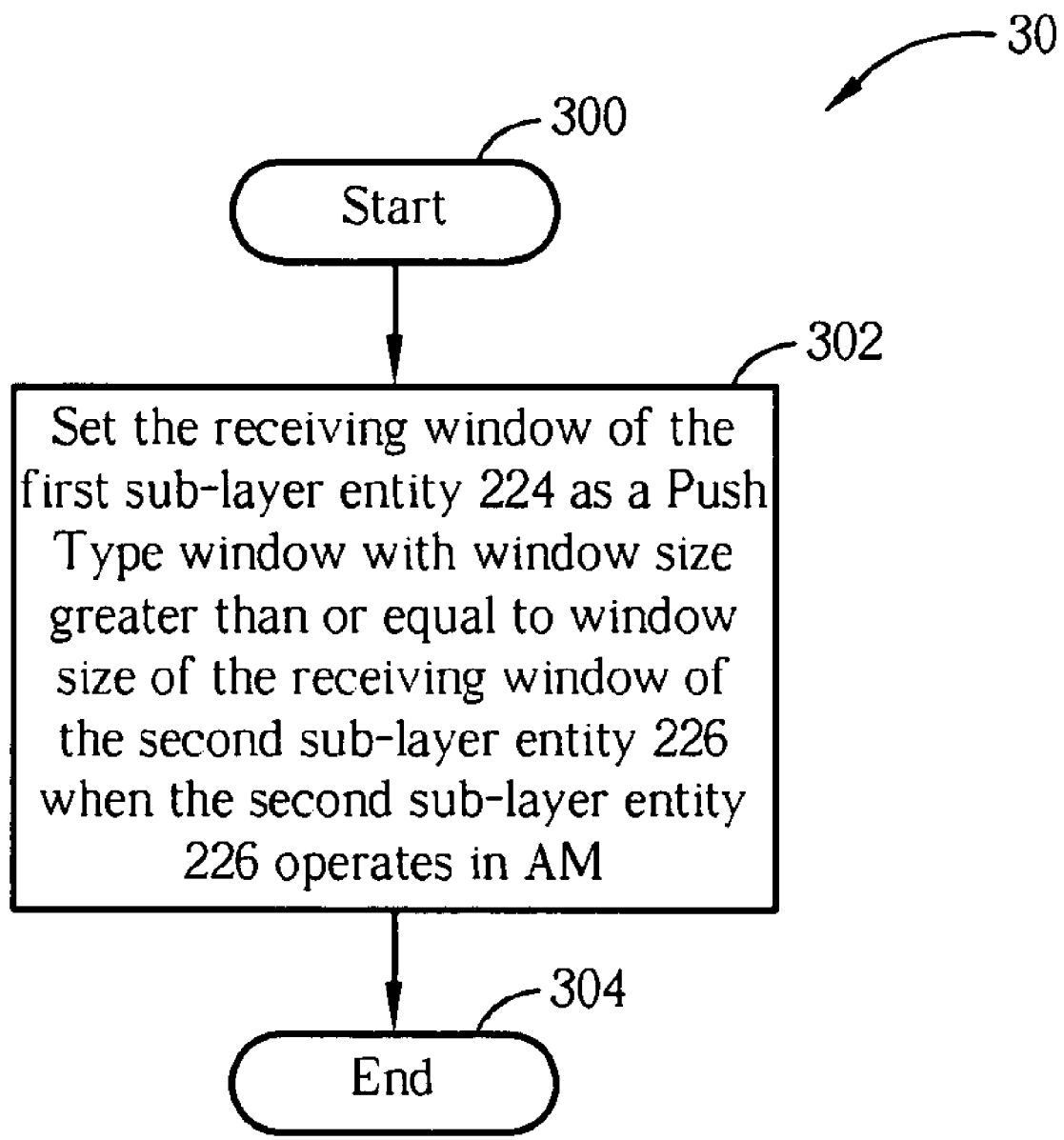
FIG. 3 is a flowchart diagram of a process according to the first embodiment of the present invention.

To ensure the correct maintenance of ciphering parameters, sliding windows can be used for the first sub-layer entity 224 and the second sub-layer entity 226 if lower layer supports out of sequence delivery. In this situation, the embodiment of the present invention provides a receiving window setup program code 220 for setting the receiving windows of the first sub-layer entity and the second sub-layer entity 226, so as to maintain synchronization between the sender and the receiver. Please refer to FIG. 3, which is a flowchart diagram of a process 30 according to the first embodiment of the present invention. The process 30 is utilized in the communications device 100 for synchronizing a ciphering parameter, and can be complied into the receiving window setup program code 220. The process 30 comprises the following steps:

Step 300: Start.

Step 302: Set the receiving window of the first sub-layer entity 224 as a Push Type window with window size greater than or equal to window size of the receiving window of the second sub-layer entity 226 when the second sub-layer entity 226 operates in AM.

Step 304: End.

When the second sub-layer entity 226 operates in AM, the second sub-layer entity 226 transmits information of packet discard to the first sub-layer entity 224 according to the present invention besides the process 30. According to the process 30, the receiving window of the first sub-layer entity 224 is set to be the Push Type one, which is advanced only when a packet corresponding to the lower edge of the window is received successfully or is informed to be discarded. In other words, when the second sub-layer entity 226 uses Push Type window as its receiving window, the first sub-layer entity 224 also uses Push Type window as its receiving window. Therefore, unless the packet corresponding to the lower edge of the receiving window of the first sub-layer entity 224 is received successfully or is informed to be discarded, the receiving window of the first sub-layer entity 224 will not be advanced. Under such circumstance, the process 30 can keep synchronization of HFN values for received packets between the Sender and the Receiver.

For example, suppose that the receiving window size of the second sub-layer entity 226 is 16 and the second sub-layer entity 226 operates in AM and supports out of sequence delivery. Therefore, according to the process 30, the window type of the receiving window of the first sub-layer entity 224 is Push Type with widow size at least equal to 16. Suppose that packets with SN=0~9 are successfully received except the packet with SN=0. Packets with SN=1~9 will be delivered to the first sub-layer entity 224 due to out-of-sequence delivery. Now, if the second sub-layer entity 226 receives a packet with SN=10 and the packet is delivered to the first sub-layer entity 224 before SN=0 is received, the packet with SN=10 will be deciphered by the first sub-layer entity 224 because it is inside the receiving window. That is, the first sub-layer entity 224 will not discard the packet with SN=10 as if the window size of the first sub-layer entity 224 is set to be 10. Therefore, the window stall situation due to the incorrect window size setup is avoided. Note that, the process 30 can be applied for the situation that the lower layer (the second sub-layer entity 226) supports either in-sequence delivery or out-of-sequence delivery.

Therefore, using the process 30, when the second sub-layer entity 226 operates in AM, the receiving window of the first sub-layer entity 224 is the Push Type window with window size greater than or equal to window size of the receiving window of the second sub-layer entity 226, so as to keep the synchronization of the HFN values for received packets between the Sender and the Receiver and to avoid window stall situation.

Figure 4:
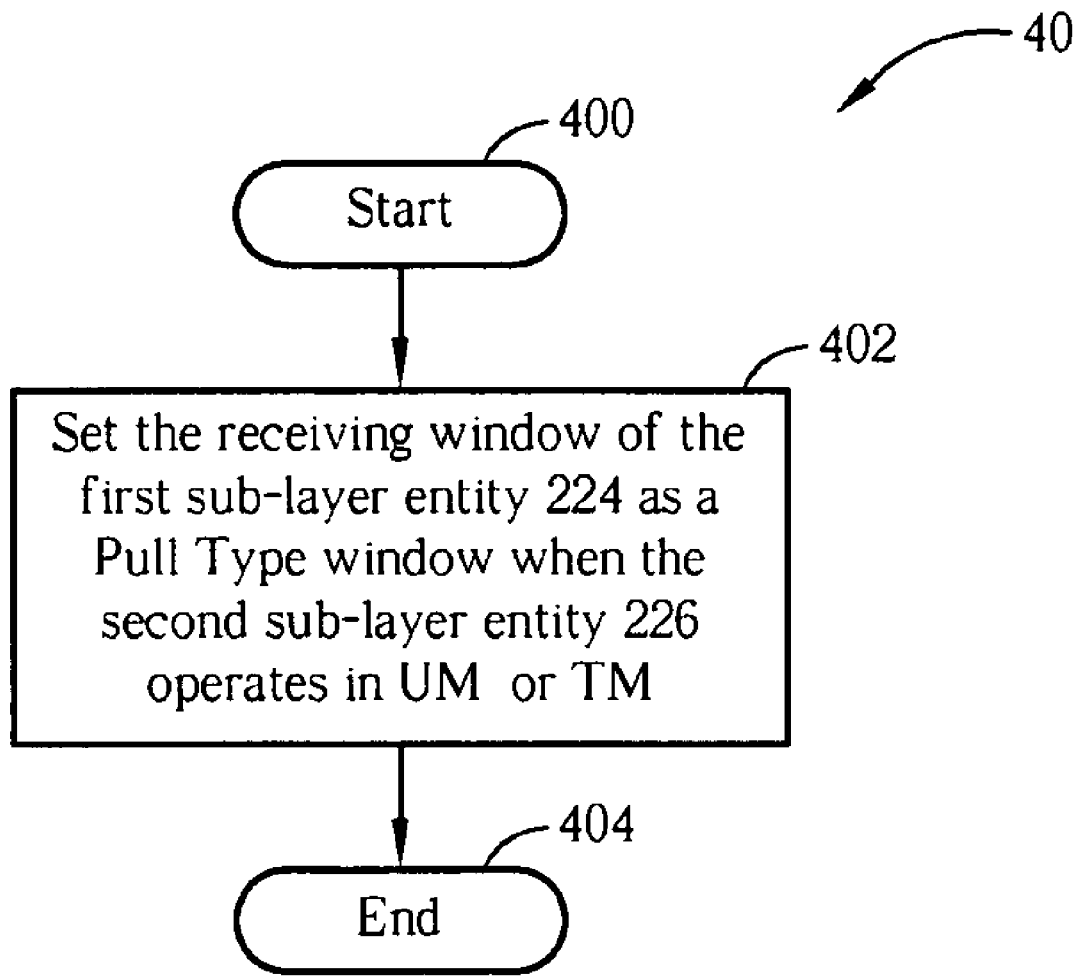
FIG. 4 is a flowchart diagram of a process according to the second embodiment of the present invention.

Please refer to FIG. 4, which is a flowchart of a process 40 according to the second embodiment of the present invention. The process 40 is utilized in the communications device 100 for synchronizing a ciphering parameter, and can be complied into the receiving window setup program code 220. The process 40 comprises the following steps:

Step 400: Start.

Step 402: Set the receiving window of the first sub-layer entity 224 as a Pull Type window when the second sub-layer entity 226 operates in UM (Unacknowledged Mode) or TM (Transparent Mode).

Step 404: End.

When the second sub-layer entity 226 operates in UM or TM, the second sub-layer entity 226 does not request retransmission of missing packets and does not transmit information of packet missing or discard to the first sub-layer entity 224. Therefore, according to the process 40, the receiving window the first sub-layer entity 224 is set to be the Pull Type one, which is advanced when a packet with SN outside the window is received and the SN is set to be the updated upper edge of the Push Type window. As a result, when the second sub-layer entity 226 operates in UM or TM, once the first sub-layer entity 224 receives a packet with SN outside the receiving window, the receiving window of the first sub-layer entity 224 is advanced. In this case, the process 40 can prevent the situations that packets are unnecessarily discarded and the receiving window is stalled.

For example, suppose that the second sub-layer entity 226 operates in UM. Therefore, according to the process 40, the window type of the receiving window of the first sub-layer entity 224 is Pull Type with a receiving window size of, say, 10. If packets with SN=0~9 are successfully received except the packet with SN=0, the receiving window of the first sub-layer entity 224 spans from 0 to 9. Next, if the first sub-layer entity 224 receives a packet with SN=10, the receiving window of the first sub-layer entity 224 is advanced to span from 1 to 10 because SN=10 is outside the receiving window. The receiving window will not be stalled. As a result, the first sub-layer entity 224 can handle successive packets successfully.

Therefore, using the process 40, when the second sub-layer entity 226 operates in UM or TM, the receiving window of the first sub-layer entity 224 is the Pull Type window, so as to prevent the situations that packets are unnecessarily discarded and the receiving window is stalled.

Figure 5:
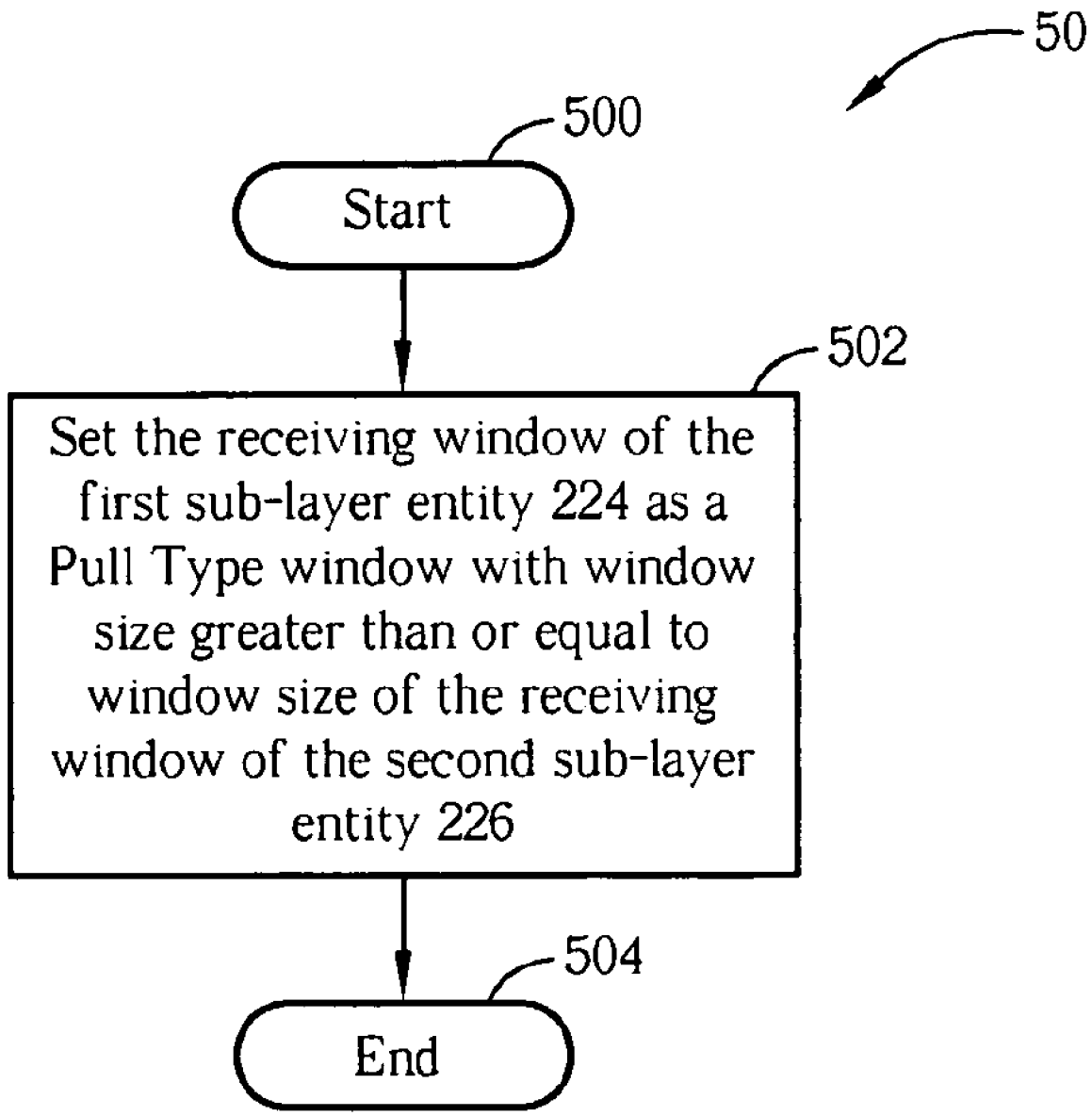
FIG. 5 is a flowchart diagram of a process according to the third embodiment of the present invention.

Please refer to FIG. 5, which is a flowchart of a process 50 according to the third embodiment of the present invention. The process 50 is utilized in the communications device 100 for synchronizing a ciphering parameter, and can be complied into the receiving window setup program code 220. The process 50 comprises the following steps:

Step 500: Start.

Step 502: Set the receiving window of the first sub-layer entity 224 as a Pull Type window with window size greater than or equal to window size of the receiving window of the second sub-layer entity 226.

Step 504: End.

According to the process 50, the receiving window of the first sub-layer entity 224 is set to be a Pull Type window with window size greater than or equal to window size of the receiving window of the second sub-layer entity 226. That is, if a packet with an SN outside the Pull Type receiving window is received, the receiving window is advanced, and the upper edge of the receiving window is set to the SN. In this situation, since window size of the receiving window of the first sub-layer entity 224 is greater than or equal to that of the second sub-layer entity 226, the span of the receiving window of the first sub-layer entity 224 always covers the SN that is missing in the receiving window of the second sub-layer entity 226. Therefore, SNs that are delivered out of sequence by the second sub-layer entity 226 will always be inside the receiving window of the first sub-layer entity 224, so as to maintain synchronization of HFN values for received packets between the Sender and the Receiver.

For example, suppose that the receiving window size of the second sub-layer entity 226 is 16 and the second sub-layer entity 226 operates in AM and supports out-of-sequence delivery. Therefore, according to the process 50, the window type of the receiving window of the first sub-layer entity 224 is Pull Type with widow size at least equal to 16. Suppose packets with SN=0~9 are successfully received except the packet with SN=0. Packets with SN=1~9 will be delivered to the first sub-layer entity 224 due to out-of-sequence delivery. The receiving window of the first sub-layer entity 224 spans from 4090 to 9. Now, if the second sub-layer entity 226 receives a packet with SN=10 and the packet is delivered to the first sub-layer entity 224 before SN=0 is received, the packet will be deciphered by the first sub-layer entity 224 and the receiving window of the first sub-layer entity 224 is advanced to spans from 4091 to 10. That is, SN=0 is inside the receiving window in comparison to the case that the SN=0 will be outside the receiving window if the window size is set to be 10. Therefore, when the packet with SN=0 is received, the first sub-layer entity 224 can decipher it with correct HFN according to the process 50. HFN out of synchronization issue is avoided by the process 50.

Therefore, using the process 50, the receiving window of the first sub-layer entity 224 is a Pull Type window with window size greater than or equal to that of the second sub-layer entity 226, so as to keep synchronization of HFN values.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of deciphering parameter synchronization in a reception end of a wireless communications system comprising:

establishing a first entity and a second entity within the reception end; and setting a receiving window of the first entity as a Push Type window with a window size greater than or equal to a window size of a receiving window of the second entity when the second entity operates in an acknowledged mode, the Push Type window defined by a window that is advanced only when a packet corresponding to a lower edge of the window is received successfully or is informed to be discarded;
wherein the first entity performs a deciphering function, the second entity is a lower entity of the first entity and the second entity is a radio link control entity.

2. The method of claim 1, wherein the receiving window of the second entity is a Push Type window.

3. The method of claim 1, wherein when the second entity operates in the acknowledged mode, the second entity transmits information of packet discard to the first entity.

4. A communications device of a wireless communications system utilized for keep deciphering parameter synchronization comprising:
a control circuit for realizing functions of the communications device;
a processor installed in the control circuit for executing a program code to operate the control circuit; and
a memory coupled to the processor for storing the program code;
wherein the program code comprises:
establishing a first entity and a second entity within the reception end; and
setting a receiving window of the first entity as a Push Type window with a window size greater than or equal to a window size of a receiving window of the second entity when the second entity operates in an acknowledged mode, the Push Type window defined by a window that is advanced only when a packet corresponding to a lower edge of the window is received successfully or is informed to be discarded;
wherein the first entity performs a deciphering function, the second entity is a lower entity of the first entity and the second entity is a radio link control entity.

5. The communications device of claim 4, wherein the receiving window of the second entity is a Push Type window.

6. The communications device of claim 4, wherein when the second entity operates in the acknowledged mode, the second entity transmits information of packet discard to the first entity.

7. A method of deciphering parameter synchronization in reception end of a wireless communications device comprising:
establishing a first entity and a second entity within the reception end; and
setting a receiving window of the first entity as a Pull Type window when the second entity operates in an unacknowledged mode or transparent mode, the Pull Type window defined by a window that is advanced when a packet with a ciphering sequence number outside the window is received and the ciphering sequence number is set to be an updated upper edge of the window;
wherein the first entity performs a deciphering function, the second entity is a lower entity of the first entity and the second entity is a radio link control entity.

8. The method of claim 7, wherein when the second entity operates in the unacknowledged mode or the transparent mode, the second entity does not transmit information of packet discard to the first entity.

9. A communications device of a wireless communications system utilized for keep deciphering parameter synchronization comprising:
a control circuit for realizing functions of the communications device;
a processor installed in the control circuit for executing a program code to operate the control circuit; and
a memory coupled to the processor for storing the program code;
wherein the program code comprises:
establishing a first entity and a second entity within the reception end; and
setting a receiving window of the first entity as a Pull Type window when the second entity operates in an unacknowledged mode or transparent mode, the Pull Type window defined by a window that is advanced when a packet with a ciphering sequence number outside the window is received and the ciphering sequence number is set to be an updated upper edge of the window;
wherein the first entity performs a deciphering function, the second entity is a lower entity of the first entity and the second entity is a radio link control entity.

10. The communications device of claim 9, wherein when the second entity operates in the unacknowledged mode or the transparent mode, the second entity does not transmit information of packet discard to the first entity.

11. A method of deciphering parameter synchronization in a reception end of a wireless communications device comprising:
establishing a first entity and a second entity within the reception end; and
setting a receiving window of the first entity as a Pull Type window with a window size greater than or equal to a window size of a receiving window of the second entity, the Pull Type window defined by a window that is advanced when a packet with a ciphering sequence number outside the window is received and the ciphering sequence number is set to be an updated upper edge of the window;
wherein the first entity performs a deciphering function, the second entity is a lower entity of the first entity and the second entity is a radio link control entity.

12. A communications device of a wireless communications system utilized for keep deciphering parameter synchronization comprising:
a control circuit for realizing functions of the communications device;
a processor installed in the control circuit for executing a program code to operate the control circuit; and
a memory coupled to the processor for storing the program code; wherein the program code comprises:
establishing a first entity and a second entity within the reception end; and
setting a receiving window of the first entity as a Pull Type window with a window size greater than or equal to a window size of the receiving window of a second entity, the Pull Type window defined by a window that is advanced when a packet with a ciphering sequence number outside the window is received and the ciphering sequence number is set to be an updated upper edge of the window;
wherein the first entity performs a deciphering function, the second entity is a lower entity of the first entity and the second entity is a radio link control entity.

* * * * *